(12) United States Patent
Makabe

(10) Patent No.: US 8,559,389 B2
(45) Date of Patent: Oct. 15, 2013

(54) WIRELESS COMMUNICATION TERMINAL, HAND-OFF METHOD IN WIRELESS COMMUNICATION TERMINAL, AND WIRELESS COMMUNICATION SYSTEM

(75) Inventor: Takeshi Makabe, Kanagawa (JP)

(73) Assignee: Kyocera Corporation, Kyoto (JP)

(*) Notice: Subject to any disclaimer, the term of this patent is extended or adjusted under 35 U.S.C. 154(b) by 589 days.

(21) Appl. No.: 12/517,030

(22) PCT Filed: Nov. 29, 2007

(86) PCT No.: PCT/JP2007/073113
§ 371 (c)(1),
(2), (4) Date: Sep. 22, 2009

(87) PCT Pub. No.: WO2008/069108
PCT Pub. Date: Jun. 12, 2008

(65) Prior Publication Data
US 2010/0067487 A1     Mar. 18, 2010

(30) Foreign Application Priority Data
Nov. 29, 2006  (JP) .................................. 2006-322674

(51) Int. Cl.
*H04W 36/00* (2009.01)

(52) U.S. Cl.
USPC .......... 370/331; 370/332; 370/333; 370/334; 455/433; 455/434; 455/345; 455/436

(58) Field of Classification Search
USPC .................... 370/331–334; 455/432.1–444
See application file for complete search history.

(56) References Cited

U.S. PATENT DOCUMENTS

| | | | | |
|---|---|---|---|---|
| 5,781,583 | A * | 7/1998 | Bruckert et al. | 375/146 |
| 7,046,648 | B2 * | 5/2006 | Zhang et al. | 370/331 |
| 7,756,082 | B1 * | 7/2010 | Dhamdhere | 370/331 |
| 2003/0002525 | A1 * | 1/2003 | Grilli et al. | 370/465 |
| 2006/0079232 | A1 | 4/2006 | Omori et al. | 455/436 |
| 2006/0126577 | A1 * | 6/2006 | Yano et al. | 370/337 |
| 2007/0177549 | A1 * | 8/2007 | Lo et al. | 370/331 |

FOREIGN PATENT DOCUMENTS

| | | |
|---|---|---|
| EP | 851631 A2 * | 7/1998 |
| JP | 2000-092542 | 3/2000 |
| JP | 2003-244742 | 8/2003 |
| JP | 2006-093945 | 4/2006 |
| JP | 2006-173861 | 6/2006 |

* cited by examiner

*Primary Examiner* — Andrew Chriss
*Assistant Examiner* — Romani Ohri
(74) *Attorney, Agent, or Firm* — DLA Piper LLP (US)

(57) ABSTRACT

It is possible to provide a wireless communication terminal, a handoff method in the wireless communication terminal, and a wireless communication system which can suppress the affect of an instantaneous disconnection in a hard handoff. The wireless communication terminal (10) includes a control unit (12) which executes a wireless communication by switching a frequency to be used by a communication unit (11). When the control unit (12) receives a search request which requests an acquisition of a handoff candidate frequency during a transmission of data formed by a plurality of continuous packets, the control unit (12) waits for completion of the transmission of the packets being transmitted. When the transmission is complete, the control unit (12) executes an inter-packet search process which controls the communication unit (11) to stop transmission of the subsequent packets and perform acquisition by switching from the currently used frequency to the handoff candidate frequency.

7 Claims, 9 Drawing Sheets

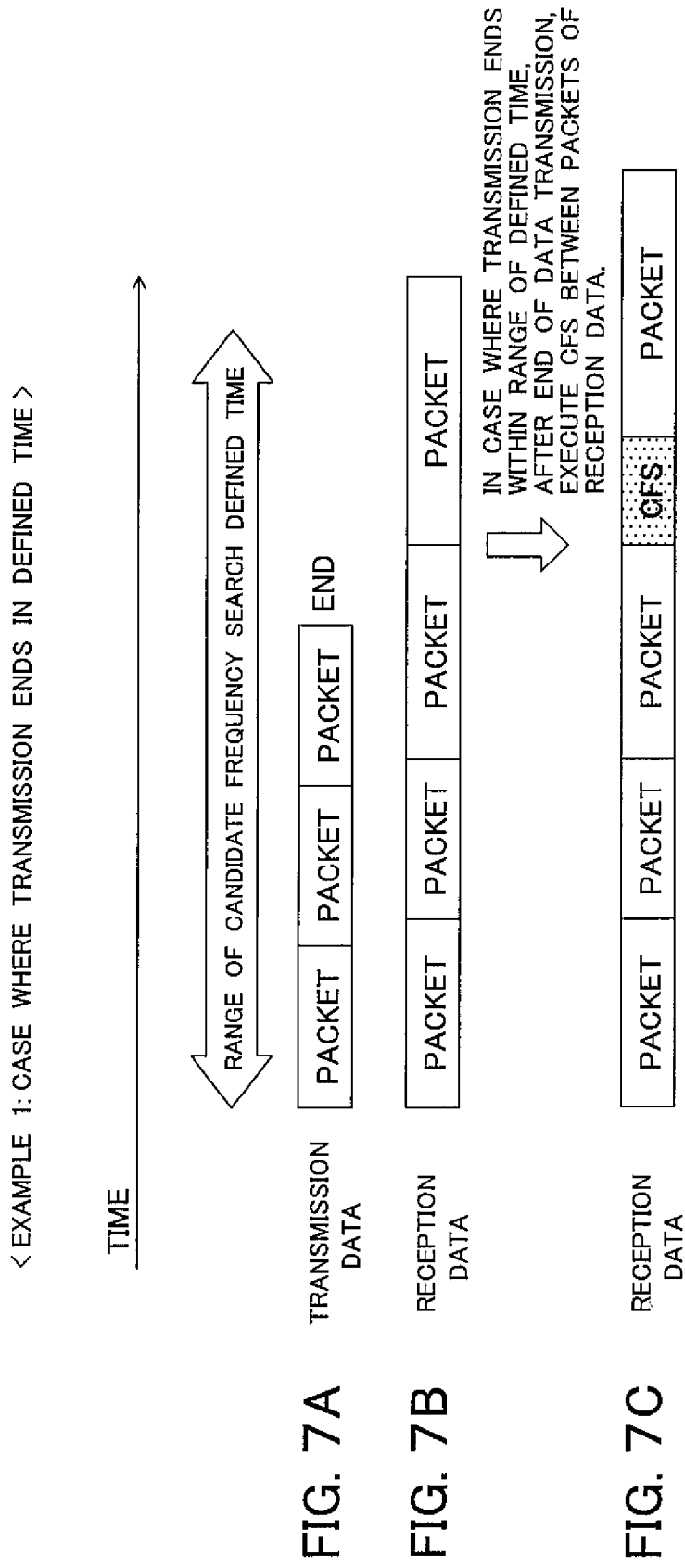

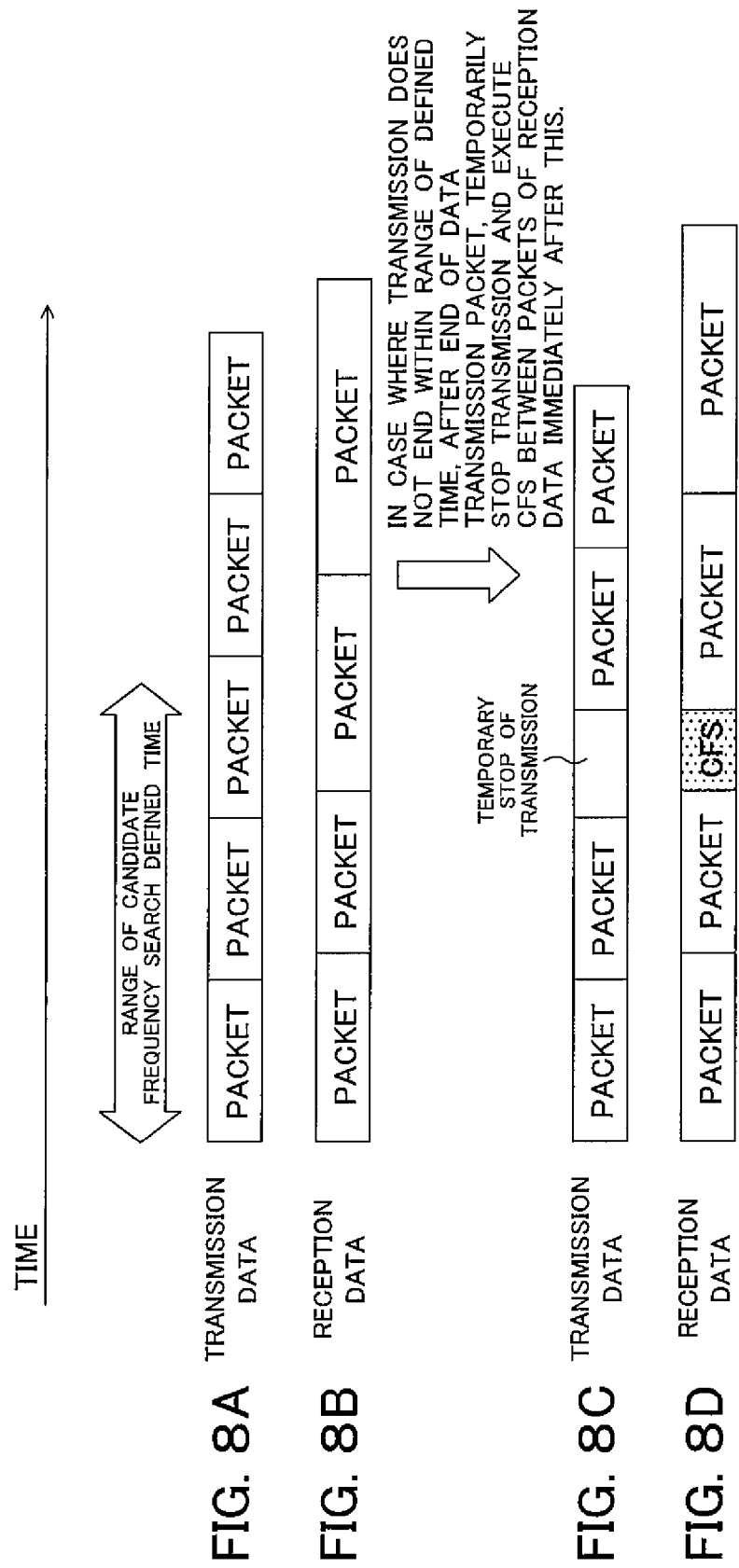

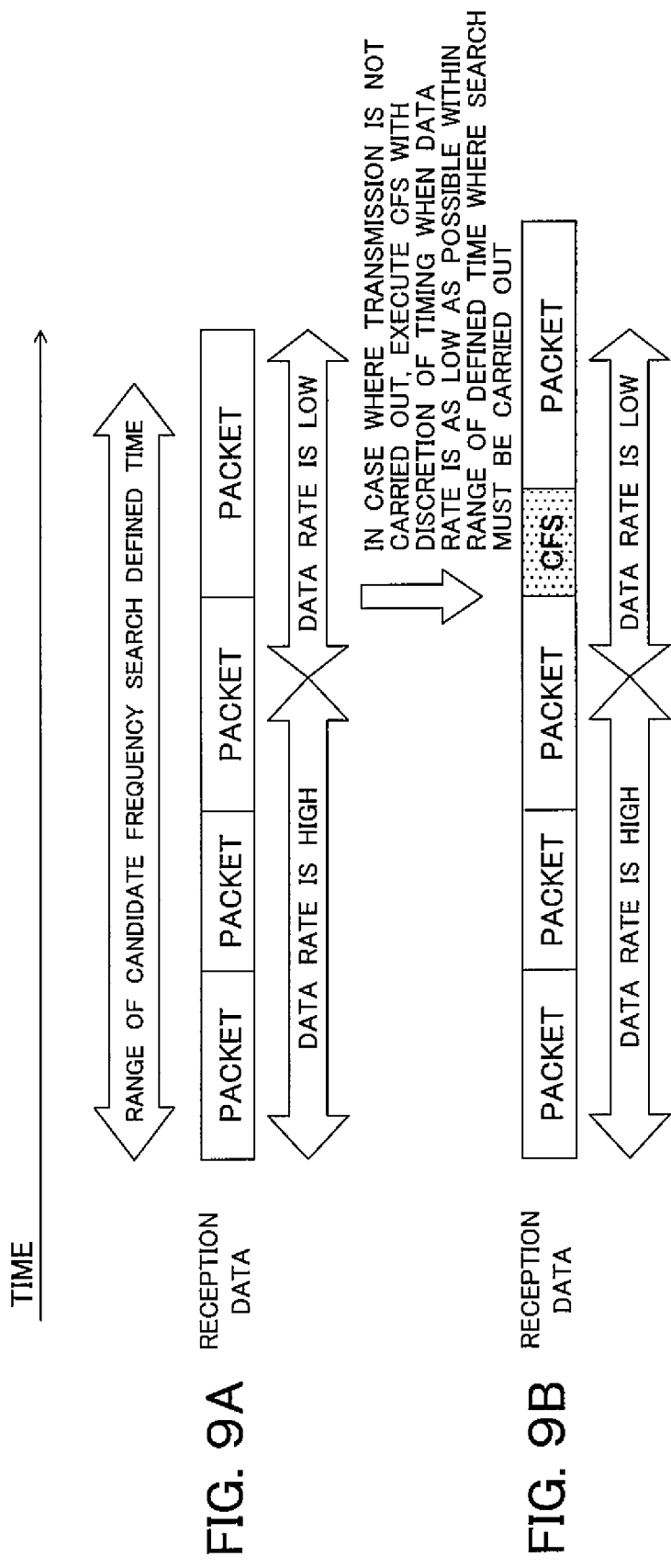

US 8,559,389 B2

WIRELESS COMMUNICATION TERMINAL, HAND-OFF METHOD IN WIRELESS COMMUNICATION TERMINAL, AND WIRELESS COMMUNICATION SYSTEM

CROSS-REFERENCE TO THE RELATED APPLICATIONS

Thai application is a national stage of international application No. PCT/JP2007/073113 filed on Nov. 29, 2007, which also claims the benefit of priority under 35 USC 119 to Japanese Patent Application No. 2006-322674 filed on Nov. 29, 2006, the entire contents of which are incorporated herein by reference.

TECHNICAL FIELD

The present invention relates to a wireless communication terminal performing a hard hand-off, a hand-off method in a wireless communication terminal, and a wireless communication system.

BACKGROUND ART

In recent years, multiband compatible wireless communication terminals which can utilize a plurality of frequency bands have been developed. In these multiband compatible wireless communication terminals and wireless communication systems utilizing a plurality of frequency bands, when the wireless communication terminal moves, the terminal becomes necessary to switch from a base station communicated with at present to a base station using a different frequency band.

The function of switching base stations (communication channels) communicated with is called "hand-off" (or "handover"). Hand-off includes two types: soft hand-off and hard hand-off (see, for example, Patent Document 1).

"Soft hand-off" is hand-off performed without switching frequencies. The base station communicated with at present (handing-off channel) and the base station desired to be newly communicated with (handed-off channel) are temporarily set in a state of simultaneous communication, then the processing for switching the base stations is carried out.

As described above, in soft hand-off, the wireless communication terminal is always communicating with one or more base stations, therefore, communication is not interrupted at the time of hand-off.

However, soft hand-off is not always possible. Soft hand-off cannot be carried out in a case where two base stations cannot provide services to that wireless communication terminal (mobile terminal) by the same frequency, therefore hard hand-off is performed.

"Hard hand-off" maintains communication with a first base station up to just before switching communication to a second base station when changing from the first base station to the second base station, then switches the frequency band. For this reason, the channel in use ends up being temporarily released, so communication ends up being interrupted transiently when switching frequency bands.

Patent Document 1: Japanese Patent Publication (A) No. 2003-244742

DISCLOSURE OF THE INVENTION

Problem to be Solved by the Invention

In the hard hand-off described above, the wireless communication terminal measures the energy strengths of pilot signals of all base stations in a list of nearby base stations having different frequencies received from the first base station. At this time, the terminal temporarily switches frequency from the frequency at the time of communication with the first base station for the measurement, therefore the signal with the first base station ends up being temporarily interrupted (transient interruption).

When the communication with the base station is temporarily interrupted during data communication, for example, a packet to be sent is broken, and the broken packet ends up being retransmitted after restoration from the transient interruption. As a result, it suffers from the disadvantage that the transmission throughput ended up being degraded.

In order to suppress transient interruption, the number of times and durations of switching of frequencies may be suppressed. In order to suppress the number of times and durations of switching of frequencies, it is considered to decrease the number of base stations (channels) to be measured for energy strength of pilot signals.

However, if the number of base stations (channels) measured is decreased, the number of hand-off candidates itself is decreased. Therefore, it suffers from the disadvantage that a base station (channel) effective as the destination of hand-off could not be found, so the hand-off ended up failing.

The present invention provides a wireless communication terminal, a hand-off method in a wireless communication terminal, and a wireless communication system, capable of suppressing occurrence of transient interruption as much as possible in hard hand-off.

Means for Solving the Problem

A first aspect of the present invention has a communication part selecting one frequency from among a plurality of frequencies capable of transmission/reception of packets and performing wireless communication with a plurality of base stations and a control part switching a frequency used by the communication part and executing the wireless communication, wherein the control part executes inter-packet search processing controlling the communication part so as to wait for completion of the transmission of a packet being transmitted when the communication part receives a search request requesting processing for acquisition of hand-off candidate frequencies during transmission of data formed by a continuous plurality of packets, to stop the transmission of the subsequent packets when completing the transmission of the packet being transmitted, to switch a frequency being used at present to a hand-off candidate frequency, and to perform acquisition processing.

Preferably, the control part executes inter-packet search processing controlling the communication part so as to wait for completion of the reception of a packet being received when the communication part receives a search request requesting processing for acquisition of hand-off candidate frequencies during the transmission of data formed by a continuous plurality of packets, if receiving packets without transmitting them, stop the transmission of the subsequent packets when completing the reception of the packet being received, switch a frequency being used at present to a hand-off candidate frequency, and to perform the acquisition processing.

Preferably, the control part executes inter-packet search processing controlling the communication part so as to wait for completion of transmission of a packet either being transmitted or received when the communication part receives a search request requesting processing for acquisition of hand-off candidate frequencies during the transmission of data formed by a continuous plurality of packets, if transmitting and receiving packets, to stop the transmission of the subsequent packets in one and wait for the completion of the transmission of the following packets in the other if transmission of packets in the other is continued even when the transmission of the packets in the other is completed, stop the transmission of the subsequent packets in the other when the transmission of the packets is completed in the other, switch the frequency being used at present to a hand-off candidate frequency, and to perform acquisition processing.

Preferably, the control part controls the communication part so as to restart the transmission processing which has been stopped when completing the inter-packet search processing.

Preferably, the control part can monitor the transmission rate in the communication part and perform the inter-packet search processing if the transmission rate after the reception of the search request becomes lower than the transmission rate at the time of the reception of the search request when receiving the search request.

Preferably, the control part specifies a search defined time based on the received search request when receiving the search request, judges the possibility of whether the transmission of a packet being transmitted is completed in the search defined time, and performs the inter-packet search processing when the transmission is not completed in the search defined time.

A second aspect of the present invention is a hand-off method continuing wireless communication by switching a communication channel from a frequency being used at present to another frequency in a wireless communication terminal performing wireless communication with a plurality of base stations, the method having; a search request reception step of receiving a search request requesting processing for acquisition of hand-off candidate frequencies, a transmission wait step of waiting for the completion of the transmission of a packet being transmitted when a search request is received in the search request reception step during the transmission of the data formed by a plurality of packets, and an acquisition processing step of stopping the transmission of the subsequent packets when the transmission is completed in the transmission wait step, switching the frequency being used at present to the hand-off candidate frequency, and performing acquisition processing.

A wireless communication system of a third aspect of the present invention includes a plurality of base stations and a wireless communication terminal performing wireless communication with the plurality of base stations, wherein the wireless communication terminal has a communication part selecting one frequency from among a plurality of frequencies capable of transmission/reception of packets and performing wireless communication, and a control part switching a frequency used by the communication part and executing the wireless communication, and the control part executes inter-packet search processing controlling the communication part so as to wait for completion of the transmission of a packet being transmitted when the communication part receives a search request requesting processing for acquisition of hand-off candidate frequencies during transmission of data formed by a continuous plurality of packets, to stop the transmission of the subsequent packets when completing it, switch the frequency being used at present to a hand-off candidate frequency, and to perform the acquisition processing.

Effect of the Invention

According to the present invention, the influence of transient interruption can be suppressed as much as possible in hard hand-off.

BRIEF DESCRIPTION OF THE DRAWINGS

FIG. 7A to FIG. 7C are diagrams for explaining the operation of the wireless communication terminal according to the embodiment of the present invention and diagrams showing relationships between packets and scheduling of search operation.

FIG. 8A to FIG. 8D are diagrams for explaining the operation of the wireless communication terminal according to the embodiment of the present invention and diagrams showing relationships between packets and scheduling of search operation.

FIG. 9A and FIG. 9B are diagrams for explaining the operation of the wireless communication terminal according to the embodiment of the present invention and diagrams showing relationships between packets and scheduling of search operation.

EXPLANATION OF NOTATIONS

Figure 1:
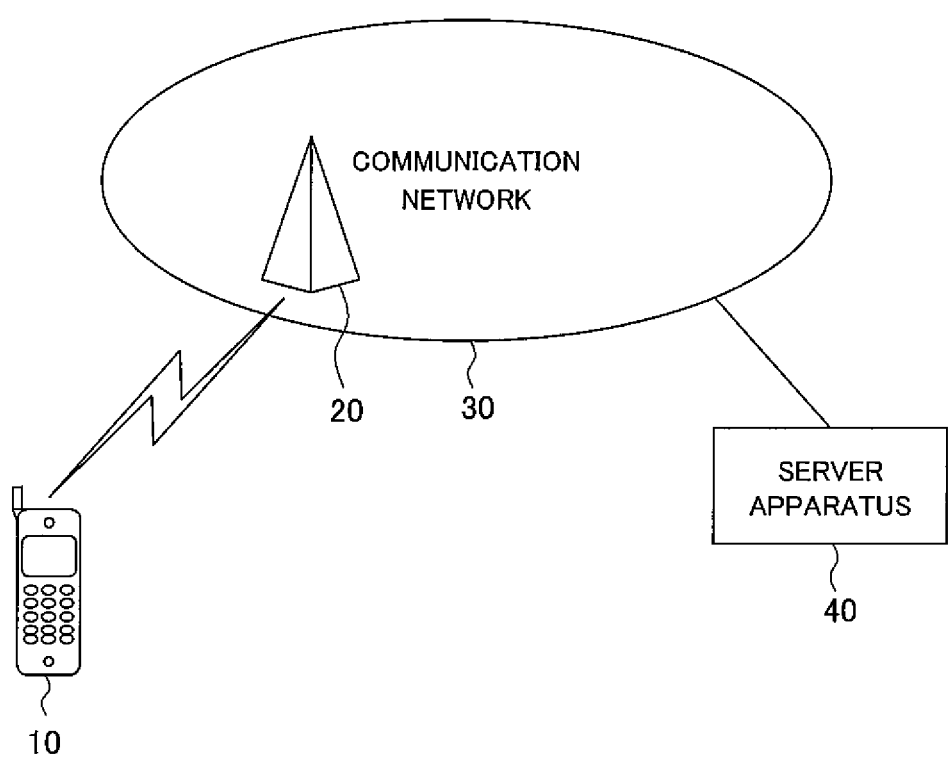
FIG. 1 is a view of a system configuration of a wireless communication system to which a wireless communication terminal according to an embodiment of the present invention is applied.

1 . . . wireless communication system, 10 . . . wireless communication terminal, 11 . . . communication part, 12 . . . control part, 13 . . . memory part, 14 . . . call voice processing part, 15 . . . speaker (SP), 16 . . . microphone (MIC), 17 . . . display part, 18 . . . operation part, 120 . . . hand-off processing part, 121 . . . message exchange part, 122 . . . parameter storage part, 123 . . . search control part, 124 . . . pilot signal strength measurement part, 125 . . . frequency setting part, 126 . . . transmission/reception data amount acquisition part, 127 . . . transmission/reception rate prediction operation part, 128 . . . transmission/reception completion time prediction operation part, 129 . . . timer, 130 . . . comparison operation part, and 20 . . . base station.

BEST MODE FOR CARRYING OUT THE INVENTION

Below, an embodiment of the present invention will be explained with reference to the attached drawings.

First, a communication system to which a wireless communication terminal according to an embodiment of the present invention can be applied will be explained.

In a CDMA2000 1x (Code Division Multiple Access 2000 1x), one of the base stations has one or more sectors divided by a pilot code. Each sector is assigned one channel for communication.

Then, the wireless communication terminal ends up communicating with the base station by using any of the channels. Below, a simple explanation will be given using an example where one base station has one pilot code linked with the base station (that is, one base station is assigned only one channel).

Specifically, the base station being communicated with at present outputs a list of nearby base stations. The wireless communication terminal receives this list and measures signal strengths of pilot signals with the base stations on the list. The wireless communication terminal transmits the results of this measured signal to the base station communicated with at present, then the base station determines the base station for the destination of hand-off based on this result. Due to this, hand-off not accompanied with a change of frequency band (shift of communication system) is carried out under the guidance of the base station.

In the CDMA2000 1x scheme, one of the IMT-2000 standards, when hard hand-off is carried out, two schemes of DAHHO (Data Assisted Hard Hand OFF) and MAHHO (Mobile Assisted Hard Hand OFF) can be utilized.

Below, each will be explained.

DAHHO is a scheme where a wireless communication terminal (for example, mobile terminal) does not perform a search of other frequencies before the hand-off, but hand-off is executed to a second base station directly designated by the first base station.

Further, in DAHHO, the first base station one-sidedly designates the second base station without referring to information of the wireless communication terminal (mobile terminal), therefore, there is no guarantee that a wireless communication terminal can acquisition the second base station designated by the first base station, so the possibility of failure in the hand-off is relatively high.

On the other hand, in MAHHO, the wireless communication terminal receives a list of nearby base stations (channels) with different frequency bands designated from the first base station being communicated with at present and performs a search of base stations (channels) on the list by switching just for an instant to a frequency of the list designated according to a search command from the first base station.

In the search of base stations on the list, the wireless communication terminal measures energy strengths of pilot signals with all base stations (channels) on the list.

The wireless communication terminal switches the frequency back to the original frequency again and reports the measured energy strengths of all base stations (channels) to the first base station, then the first base station determines the second base station from among the base stations on the list based on the reported energy strengths.

Then, the first base station transmits an instruction to the wireless communication terminal for switching the communication to the second base station, and the wireless communication terminal executes the hand-off according to this instruction.

FIG. 1 is a view of the system configuration showing a wireless communication system to which a wireless communication terminal according to an embodiment of the present invention is applied.

A wireless communication system 1 is, as shown in FIG. 1, configured by a wireless communication terminal 10, base station 20, communication network 30, and server apparatus 40.

The wireless communication terminal 10 according to the present embodiment, as shown in FIG. 1, has the function of using the wireless communication part to request desired data via the base station 20 and through the communication network 30 to the server apparatus 40 and displaying Web data or other information obtained via the base station 20 in response to the request on the display part.

Note that, in the present embodiment, the explanation will be given illustrating a mobile phone as the wireless communication terminal. Note that, in the present embodiment, while the explanation is given illustrating a mobile phone as the wireless communication terminal, the embodiment can be applied to other wireless communication terminals as well.

In recent years, in the wireless communication system 1, effective utilization of frequency bands used has been promoted. Reorganization of frequency bands has been studied for making the used frequency bands match with global standards and specifications.

For example, in a wireless communication system using CDMA2000 1x, at present, in Japan, the Japanese specification 800 MHz band (hereinafter referred to as "the present 800 MHz band") is being used. There are plans for reorganizing this frequency band to a new 800 MHz band of the global standards and specifications.

Note that, the present 800 MHz band and the new 800 MHz band differ in allocation of the frequency bands used for uplink (communication from the wireless communication terminal 10 to the base station 20 side) and downlink (communication from the base station 20 side to the wireless communication terminal 10) etc.

In view of this background, multiband compatible wireless communication terminals capable of communication by the existing frequency band (present 800 MHz) and new frequency band (new 800 MHz) are being developed. Further, wireless communication terminals capable of communication even by a higher frequency band (2 GHz) in addition to these frequency bands are being developed as well.

The multiband compatible wireless communication terminal 10 engages in wireless communication with the base station 20 through the channel assigned by this base station 20. At this time, the wireless communication terminal 10 can transmit and receive wireless signals by a plurality of frequency bands. Specifically, an example is shown in which the wireless communication terminal 10 can transmit and receive wireless signals by using the existing frequency band (present 800 MHz), new frequency band (new 800 MHz), and high frequency band (2 GHz).

The above communication systems using different frequency bands are assigned "band classes" prescribed by the 3GPP2 (3rd Generation Partnership Project 2) as identification numbers for the base station 20 and the wireless communication terminal 10 to identify the frequency bands.

For example, in a list of nearby base stations etc. in information informed from the base station 20 to the wireless communication terminal 10, these band classes are used for reporting the communication systems existing around the wireless communication terminal 10 and so on.

Note that, the existing frequency band (present 800 MHz band) is classified as the "band class 3", the new frequency band (new 800 MHz band) is classified as the "band class 0", and the high frequency band (2 GHz band) is classified as the "band class 6".

Below, a hand-off method in a wireless communication terminal and a wireless communication system according to an embodiment of the present invention will be explained.

Figure 2:
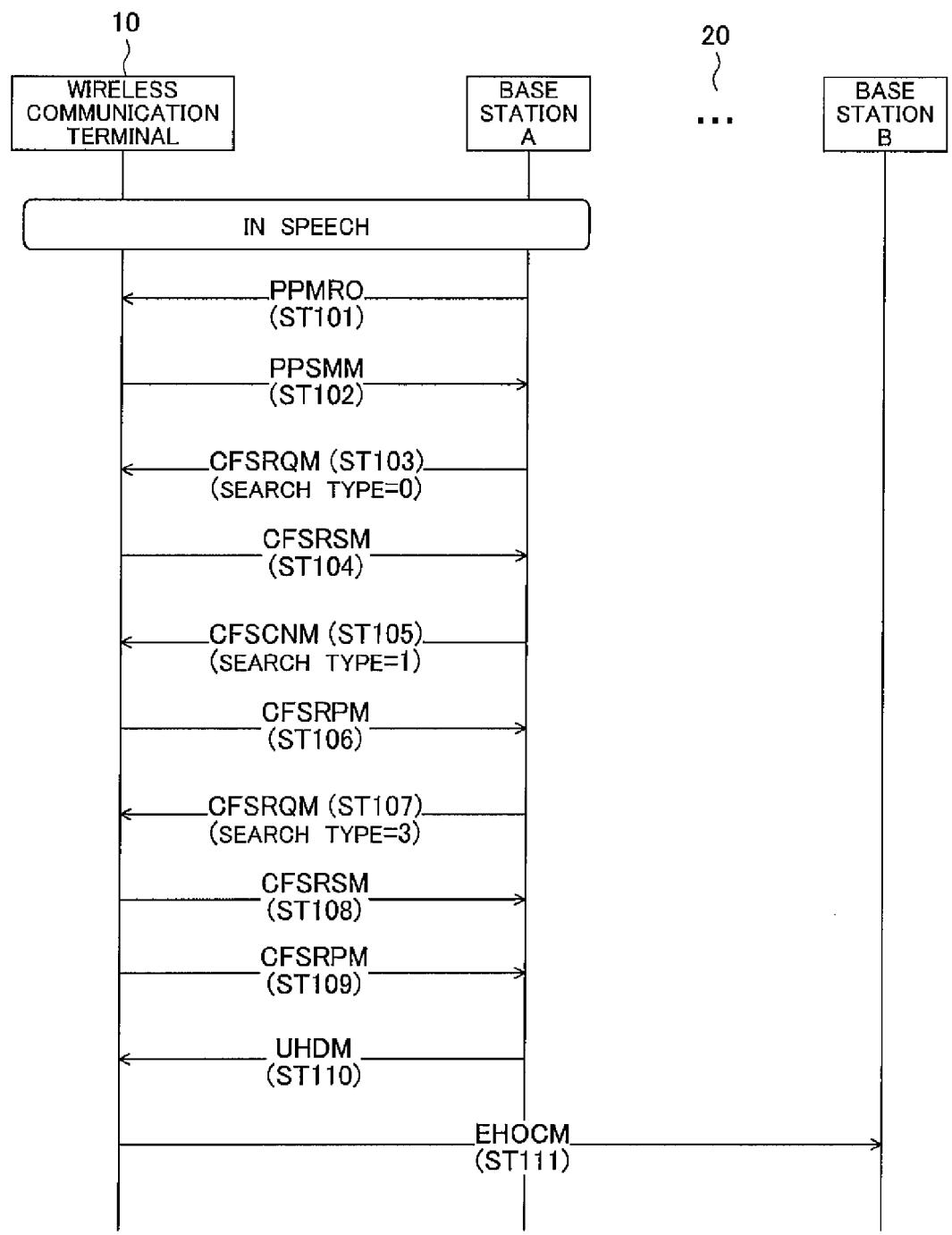
FIG. 2 is a diagram for explaining a representative sequence of a wireless communication system when performing a MAHOO operation.

FIG. 2 is a diagram for explaining a representative sequence of a wireless communication system when performing a MAHOO operation explained before, as an example of the hard hand-off.

Figure 3:
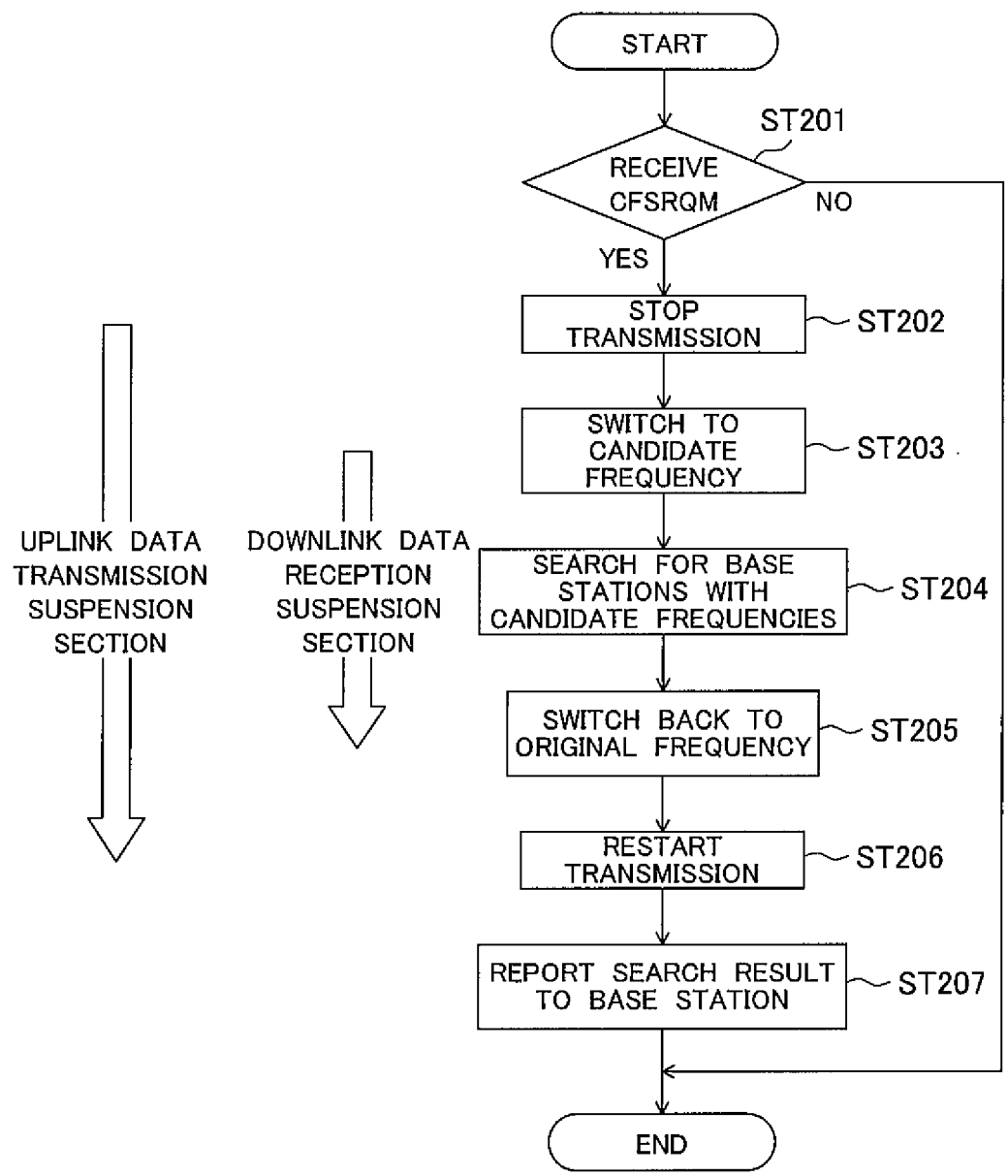
FIG. 3 is a flow chart for explaining the operation of a hand-off candidate frequency search when using MAHOO.

FIG. 3 is a flow chart for explaining the operation of a search for hand-off candidate frequencies when using MAHOO.

First, with reference to FIG. 2, a representative sequence of a wireless communication system, where a MAHOO operation is performed for a base station 20 (base station B) with a different frequency when the wireless communication terminal 10 performs communication by using a base station 20 (base station A), will be explained.

As described above, MAHHO is a method where a base station 20 of the CDMA determines a base station 20 for hard hand-off based on energy strengths of base stations measured by the wireless communication terminal 10 acting as a mobile station. MAHHO has the effects of raising a rate of success of the hard hand-off between frequencies and making interruption of a call harder.

MAHOO monitors the result of the pilot signal strength measurement reported from the wireless communication terminal 10 in a PPSMM (Periodic Pilot Strength Measurement Message) and starts the hand-off when the energy strength of its own station becomes a constant or less, so is called as "PPSMM based".

Specifically, in FIG. 2, the base station 20 (base station A) sends a pilot signal strength measurement request of a PPMRO (Periodic Pilot Measurement Request Order) to the wireless communication terminal 10 (ST101) and requests that the wireless communication terminal 10 periodically report the received energy strength of its own station.

As opposed to this, the wireless communication terminal 10 sends a PPSMM (Periodic Pilot Strength Measurement Message) to the base station 20 to report the energy strength in the base station 20 (ST102).

The report is periodically sent at an interval designated by the previous PPMRO (0.8 to 10.08 seconds, usually about 2 to 4 seconds). Note, limited to a case where the threshold value is designated by the PPMRO, for the purpose of avoiding traffic confusion, the wireless communication terminal 10 is exempted from reporting during a period where the threshold value is not satisfied.

Next, the base station 20 (base station A) judges the energy strength of its own station reported by the PPSMM and regards a case where the strength becomes less than a certain level as a possibility of loss of a call.

At this time, in order to reduce this possibility, the base station 20 (base station A) sends to the wireless communication terminal 10 a candidate frequency search request message (CFSRQM) (ST103) and reports the frequency of the hand-off candidate system, list of base stations, search window size, search interval, threshold value, and other parameters.

Here, one of the important parameters is the search type. This indicates either of three stages of "0=search stop", "1=single search start", and "3=periodic search start".

"0=search stop" can be used when only information of various types of parameters is transferred to the wireless communication terminal 10, and an actual search is not carried out, but stopped. "1=single search start" can be used when the wireless communication terminal 10 is made to perform a search only one time and then made to report the result. "3=periodic search start" can be used when the mobile station is made to periodically perform a search and made to periodically report the result.

A network can selectively use the three search types in accordance with the state of traffic or topographic situation.

Then, the wireless communication terminal 10 sends a candidate frequency search response message (CFSRSM) to the base station 20 (base station B) to report that the base station received the CFSRQM (ST104).

As opposed to this, the base station 20 (base station B) sends a CFSCNM (Candidate Frequency Search Control Message) to the wireless communication terminal 10 to designate the search type as "1=single search start" (ST105).

Here, unlike the CFSRQM, no parameter other than the search type is conveyed, therefore the influence exerted upon the traffic is light and weak. In a state where parameters such as the frequency of the frequency system of the hand-off candidate system and the pilot list are fixed in nature and are seldom changed, the network can use the CFSCNM so as not to exert an influence upon the traffic limited to when only a change of the search type is to be made.

Next, the wireless communication terminal 10 sends a candidate frequency search report message (CFSRPM) to the base station 20 (base station A) to report the results of measurement of the pilots of the candidate system designated by the CFSRQM (ST106). At this time, a candidate frequency search (CFS) is carried out.

If a base station with a candidate frequency having a strength strong enough for the hand-off is reported at this point of time, the base station 20 (base station A) can request the wireless communication terminal 10 to perform the hand-off. When the hand-off condition is not satisfied, the base station 20 (base station A) continuously sends the CFSRQM and designates the search type as "3=periodic search start" (ST107).

Then, the wireless communication terminal 10 sends the candidate frequency search response message (CFSRSM) to the base station 20 (base station A) to report that the terminal received the CFSRQM (ST108).

The wireless communication terminal 10 sends the CFSRPM to the base station 20 (base station A) and periodically reports the measurement results of the pilots of the candidate system designated by the CFSRQM (ST109). At this time, the candidate frequency search (CFS) is carried out.

The report is periodically sent by a search period designated by the CFSRQM (0.48 to 200 seconds, usually about 2 to 4 seconds). Note, limited to the case where the threshold value is designated by the CFSRQM, for the purpose of avoiding the traffic confusion, the wireless communication terminal 10 is exempted from reporting during the period where the threshold value is not satisfied.

Upon receipt of the report of a base station satisfying the hand-off, the base station 20 (base station A) sends a universal hand-off direction message (UHDM) to the wireless communication terminal 10 and requests hand-off to the base station 20 (base station B) with the candidate frequency (ST110).

The wireless communication terminal 10 executes the hand-off as designated and sends an extended hand-off completion message (EHOCM) to the new base station 20 (base station B), whereby the MAHHO operation is completed (ST111).

As described above, MAHHO is a hand-off scheme in which in the middle of communicating with a certain base station 20 (base station A), the wireless communication terminal 10 switches from the frequency used at present to another frequency so as to search for another base station 20 (base station B) having a strong signal strength pilot signal and then switches the communication to the base station 20 having the strongest signal strength.

Accordingly, a switch of the frequency occurs at the time of the hand-off candidate frequency search. Therefore, the transmission data and reception data being transferred are interrupted during the data communication, so the data communication becomes necessary to perform useless retransmission processing.

In particular, during execution of the periodic search of the search type=3, the data is interrupted at intervals of, for example, 2 to 4 seconds. Due to this, although the search is data communication to which an extreme real time property is not required unlike audio (voice), the transmission/reception efficiency (throughput) is lowered since the data is retransmitted.

Specifically, as shown in FIG. 3, when a CFSRQM of the search type=3 is transmitted from the base station 20 and the search of the hand-off candidate frequency is started (ST201 "Yes"), the wireless communication terminal 10 first stops the transmission (ST202).

Next, the wireless communication terminal 10 executes a search of the base station with this candidate frequency by switching to the candidate frequency (ST203, ST204), switches back to the original frequency, and restarts the transmission (ST205, ST206). Then, the wireless communication terminal 10 reports the result of the search of the hand-off candidate frequencies as CFSRPM to the requesting base station 20 (ST207).

For this reason, if the data is being transmitted at the time of the transmission stop described above, the data is broken, so the transmission becomes necessary to resend the data again at the time of restart of transmission. Further, when the frequency is switched at the time of the data reception, the data during reception is broken at that time as well, so the transmission is necessary to retransmit the request again and acquire the data again. Accordingly, a drop in the throughput ends up being caused.

For this reason, a wireless communication terminal according to an embodiment of the present invention which will be explained below, is configured so as to determine a start timing of search processing for measuring the signal strengths accompanied with switching of frequency while taking note of the units of transfer, that is, the packets, so as to thereby reduce breakage of data and avoid deterioration of the data transfer efficiency at the time of execution of hard hand-off.

The search processing start timing is at the border of a packet or when the throughput is lowered. Details thereof will be explained below.

Figure 4:
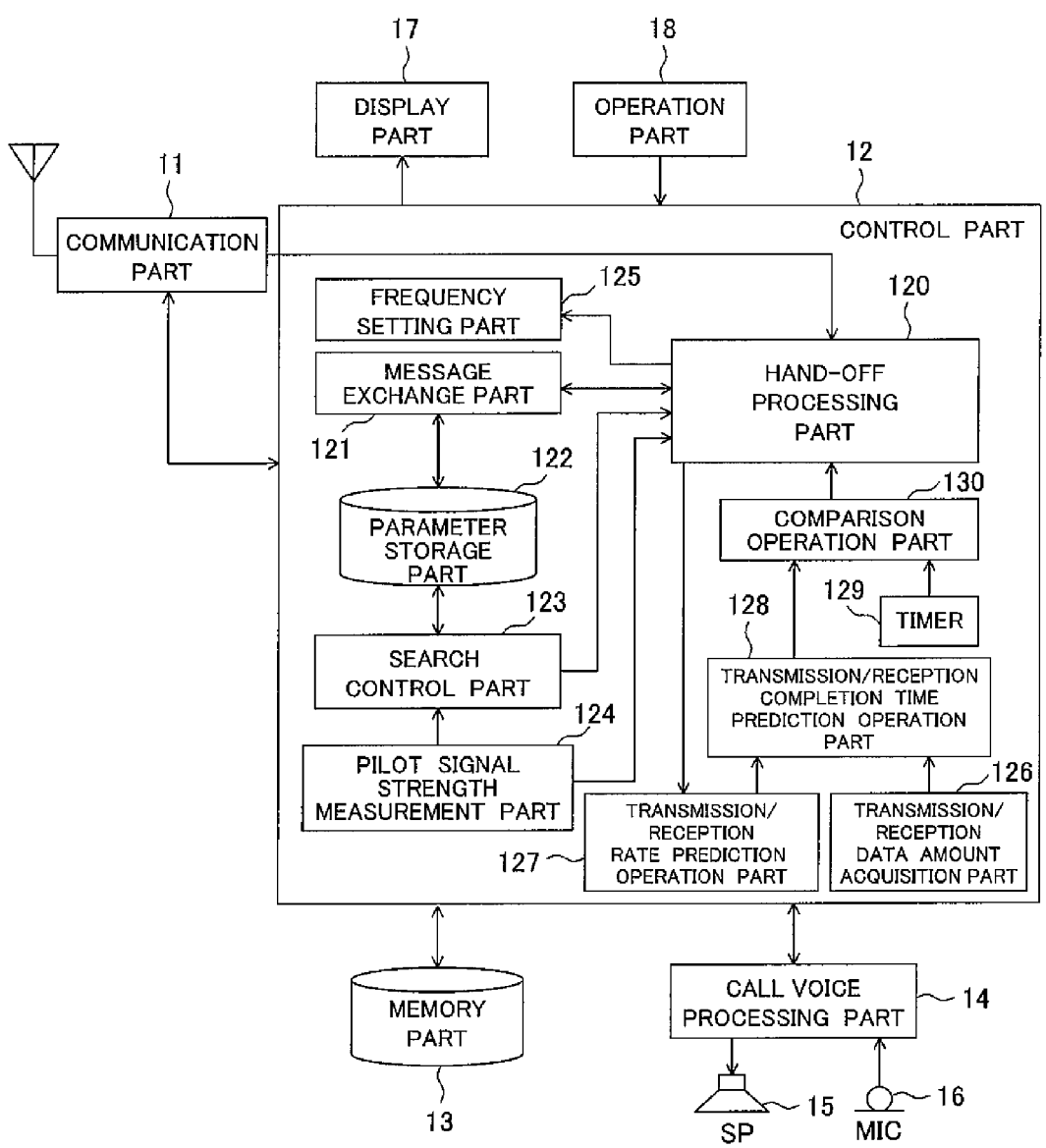
FIG. 4 is a block diagram showing an example of the configuration a signal processing system of a wireless communication terminal according to an embodiment of the present invention

FIG. 4 is a block diagram showing an example of the configuration of a signal processing system of a wireless communication terminal according to an embodiment of the present invention.

Here, the functional blocks of a signal processing system in a mobile phone serving as the wireless communication terminal 10 will exemplified.

The wireless communication terminal 10, as shown in FIG. 4, has a communication part 11, control part 12, memory part 13, call voice processing part 14, speaker 15 (SP), microphone (MIC) 16, display part 17, and operation part 18.

The communication part 11 performs transmission and reception of wireless signals through the channel assigned by any of the base stations 20 with the base station 20.

This communication part 11 is capable of transmission and reception of wireless signals in a plurality of frequency bands. As an example, specifically, the communication part 11 is capable of transmission and reception of wireless signals using the existing frequency band (present 800 MHz band), new frequency band (new 800 MHz band), and high frequency band (2 GHz band).

Note that, the above communication systems using different frequency bands are assigned "band classes" prescribed by the 3GPP2 (3rd Generation Partnership Project 2) as identification numbers for the base station 20 and the wireless communication terminal 10 to identify the frequency bands, as explained before.

For example, in a list of nearby base stations (N-list) etc. in information informed from one base station 20 to the wireless communication terminal 10, these band classes are used for reporting the communication systems existing around the wireless communication terminal 10 to the wireless communication terminal 10 and so on.

Note that, the present frequency band (present 800 MHz band) is classified as the "band class 3", the new frequency band (new 800 MHz band) is classified as the "band class 0", and the high frequency band (2 GHz band) is classified as the "band class 6".

Degrees of priority are set in advance for these frequency bands. The degree of priority of the band class 6 is the highest, next the band class 0, and the degree of priority of the band class 3 is the lowest.

Further, the band classes and degrees of priority explained here are only examples and are largely governed by the infrastructure of the telecommunications carrier.

The communication part 11 identifies the frequency band at the time of the communication with the base station 2 according to the above band class.

The control part 12 controls the operation of the wireless communication terminal 10.

Specifically, the control part 12 outputs a voice signal (voice data) included in the signal output from the communication part 11 to the call voice processing part 14 and outputs a voice signal output from the call voice processing part 14 to the communication part 11.

Further, the control part 12 controls which among the plurality of frequencies is to be used by the communication part 11 to transmit and receive the wireless signal and makes the communication part 11 execute the hand-off in response to a hand-off request from the base station 20.

The "hand-off" means processing for switching the communication target from the base station 20 communicated with at present to another base station, that is, a change of channels.

When the communication part 11 receives a request for search of the hand-off candidate frequencies from the base station 20 in the middle of communication and switches the frequency being used at present to a hand-off candidate frequency to perform an acquisition operation, the control part 12 controls the system so as to execute the search of hand-off candidate frequencies when the transmission of a packet being transmitted or reception of a packet being received in a continuous transmission packet train or reception packet train is completed.

For this reason, the control part 12, as shown in FIG. 4, has a hand-off processing part 120, message exchange part 121, parameter storage part 122, search control part 123, pilot signal strength measurement part 124, frequency setting part 125, transmission/reception data amount acquisition part 126, transmission/reception rate prediction operation part 127, transmission/reception completion time prediction operation part 128, timer 129, and comparison operation part 130.

The message exchange part 121 exchanges the various types of messages shown in FIG. 2 (PPMRO, PPSMM, CFS- RQM, CFSRSM, CFSCNM, CFSRPM, CFSRSM, CFSRPM, UHDM, and EHOCM) in order for the wireless communication terminal 10 to execute the MAHHO sequence with the base station 20.

Among those, the message exchange part 121 holds the frequency of the hand-off candidate communication system, list of base stations, search window size, search interval, search type, threshold value, and other various parameters attached to a search request message (CFSRQM) transmitted from the base station 20 in the parameter storage part 122.

The parameter storage part 122 is actually assigned to a predetermined region of the memory part 13. Parameters are held here.

The search control part 123, under the control of the hand-off processing part 120, performs a pilot search of the nearby base stations 20 during the communication and the base stations 20 switched at the time of the hard hand-off based on various types of parameters held in the parameter storage part 122.

Here, the "pilot search" means processing setting a search window and searching including multiple paths of the pilot channel useable in this search window.

The pilot signal strength measurement part 124 measures the signal strength of the pilot signal from the base station 20, more specifically, the strength of the signal for each channel divided to pilot signals and the strength of the channel signal to be used in a signal which can be received by the communication part 11.

The method of the signal strength measurement includes a method of measuring the energy strength of the pilot signal. However, here, the method of the signal strength measurement is not limited.

The frequency setting part 125 performs the frequency switching control of the communication part 11 in accordance with the frequency assignment of the new base station shown in the hand-off instruction analyzed by the hand-off processing part 120 as will be explained later.

The transmission/reception data amount acquisition part 126 acquires the transmission/reception data amount described in a header of the transmission/reception packet and supplies it to the transmission/reception completion time prediction operation part 128.

The transmission/reception completion time prediction operation part 128, other than this, is supplied with a transmission/reception rate computed by the transmission/reception rate prediction operation part 127 under the control of the hand-off processing part 120. Here, a prediction operation of remaining amount of data for transmission/reception is executed and the result supplied to the comparison operation part 130.

Note that, the transmission/reception rate is estimated from the signal strengths of the hand-off candidate frequencies measured by the pilot signal strength measurement part 124.

The comparison operation part 130 is supplied with defined time data required for one search processing operation monitored by the timer 129 other than the result of the prediction operation of the remaining amount of data for transmission/reception. The comparison operation part 130 compares this with the transmission/reception completion time generated by the transmission/reception completion time prediction operation part 128 and supplies the result to the hand-off processing part 120.

The comparison operation part 130 is mainly covers the acquisition processing at a certain period of the search type=3 here, therefore judges whether or not the transmission/reception of a packet being transmitted/reception at present can be completed even if this time search is delayed until the next arriving search period.

The hand-off processing part 120 controls each of the above message exchange part 121, search control part 123, pilot signal strength measurement part 124, and frequency setting part 125 to execute hand-off processing when receiving a universal hand-off direction message (UHDM) from the base station 20.

Specifically, the hand-off processing part 120 analyzes the universal hand-off direction message (UHDM) and specifies the sort of hand-off (sort of soft hand-off and hard hand-off), allocation of frequencies, pilot PN code sequence, search window information, etc.

Further, the hand-off processing part 120 controls each of the above transmission/reception data amount acquisition part 126, transmission/reception rate prediction operation part 127, transmission/reception completion time prediction operation part 128, timer 129, and comparison operation part 130 and executes the hand-off processing.

Specifically, the hand-off processing part 120 receives a search request of hand-off candidate frequencies from the base station 20 being communicated with by the communication part 11. Then, when switching the frequency being used at present to a hand-off candidate frequency to perform an acquisition operation, the hand-off processing part 120 executes the search of hand-off candidate frequencies when the transmission of a packet being transmitted or reception of a packet being received in a continuous transmission packet train or reception packet train is completed.

Note that, the functions of the blocks 120 to 130 described above are achieved by the control part 12 executing programs stored in the memory part 13. Only blocks substantially differentiated from other blocks and built-in the control part 12 are not pointed out. Processing parts are separately expressed only for simplification of explanation.

The memory part 13 stores various types of data utilized for the processing in the control part 12.

The memory part 13 holds, for example, programs of a computer provided in the control part 12, an address book for managing personal information such as phone numbers and e-mail addresses of other parties, a voice file for playing back an incoming call voice and an alarm sound, an image file for the standby screen, various types of setting data, temporary data utilized in the processing process of the programs, and so on.

Note that, the above memory part 13 is configured by, for example, a nonvolatile memory device (nonvolatile semiconductor memory, hard disc device, optical disc device, etc.), a random accessible memory device (for example, SRAM or DRAM), or the like.

The call voice processing part 14 performs the processing of the voice signal received at the communication part 11 and output at the speaker 15 and audio signal input at the microphone 16.

Namely, the call voice processing part 14 amplifies a sound signal input from the microphone 16, performs analog-to-digital conversion, and further applies encoding or other signal processing to this to convert it to digital audio data and outputs the result to the control part 12.

Further, the call voice processing part 14 applies decoding, digital-to-analog conversion, amplification, or other signal processing to the voice data supplied from the control part 12 to convert the voice data to an analog voice signal and outputs the result to the speaker 15.

The display part 16 is configured by using, for example, a liquid crystal display panel, an organic EL (Electro-Luminescence) panel, or other display device and displays an image in accordance with a video signal supplied from the control part 12.

The display part 17 displays, for example, a phone number of a destination at the time of a send operation, a phone number of the other party at the time of the reception, contents of received mail and transmitted mail, the date, time, remaining battery power, success of a send operation, a standby screen, and other various information and images.

Further, the operation part 18 has, for example, a power key, speak key, number keys, letter keys, direction keys, an execute key, a send key, and other keys to which various functions are assigned. When these keys are operated by the user, the operation part 18 generates signals corresponding to those operation contents and inputs these as an instruction of the user to the control part 12.

Figure 5:
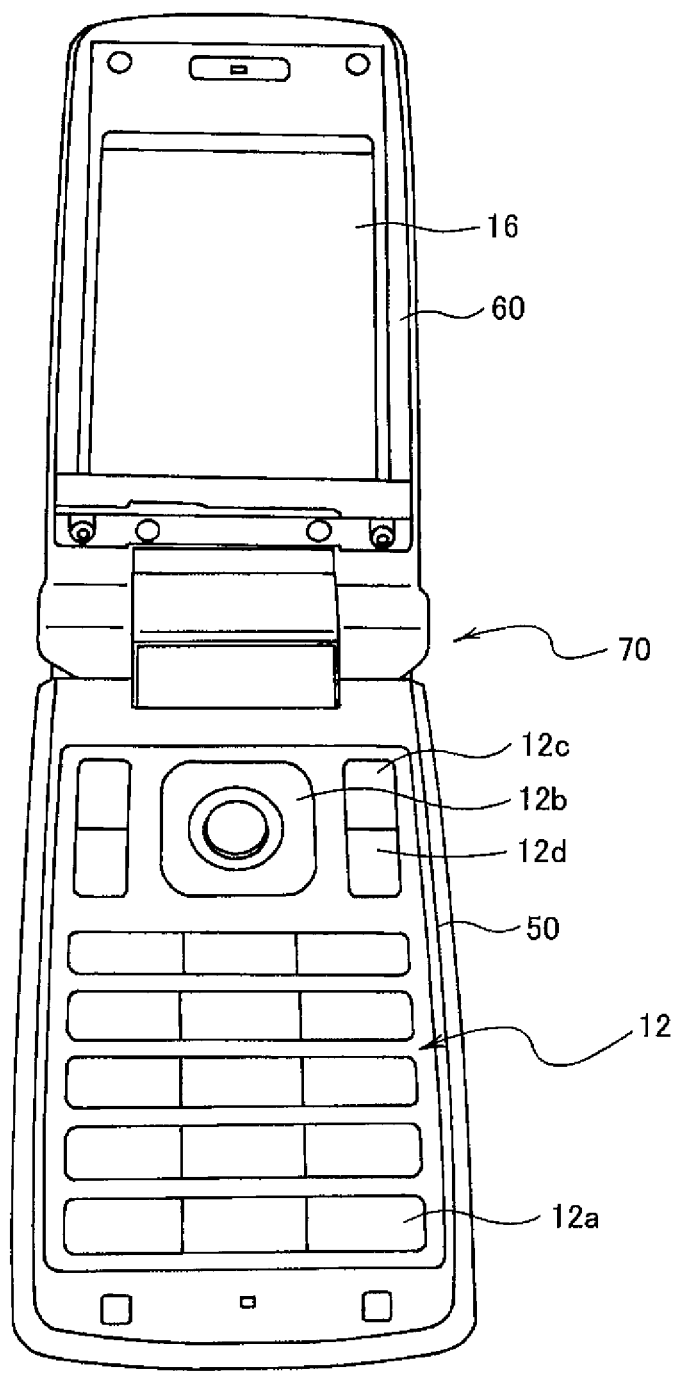
FIG. 5 is a perspective view showing an example of the configuration of an outer appearance of a mobile phone as a mobile terminal device according to an embodiment of the present invention.

FIG. 5 is a perspective view showing an example of the configuration of an outer appearance of a mobile phone used as a mobile terminal device according to an embodiment of the present invention. FIG. 5 mainly shows the array of keys.

As shown in FIG. 5, a mobile terminal device 10A is configured as a so-called flip-open type mobile phone and is provided with a sender case 50 and a receiver case 60, which are connected to each other pivotally between an open state and a closed state.

The sender case 50 and the receiver case 60 form a housing of the mobile terminal device as a whole by connection of end portions by a connection part 70 serving as the center axis of relative opening and closing operations.

The sender case 50 is provided with an operation input part 12 in which various types of keys are arranged exposed at the front surface. Further, the receiver case 60 is provided with a display part 16.

In the operation input part 12 of the sender case 50, as various types of keys, for example, a tenkey part 12a, a cursor key 12b, function keys 12c, etc. are arranged.

The keys of the tenkey part 12a described above are assigned pluralities of characters such as Sino-Japanese ideographs, alphanumerics, phonetic kana marks, and symbols.

The effective characters intended by the tenkey part 12a are switched by a toggle operation by an "input mode change key (identification key)" assigned to any of the function keys 12c.

Any of these keys, for example, a function key 12c, is assigned as the operation key for sending a send instruction etc.

Note that, this operation key may be assigned to a not shown side key as well which is arranged on a side surface of the sender case.

Next, an example of operation of the wireless communication terminal 10 of FIG. 4 will be explained.

Figure 6:
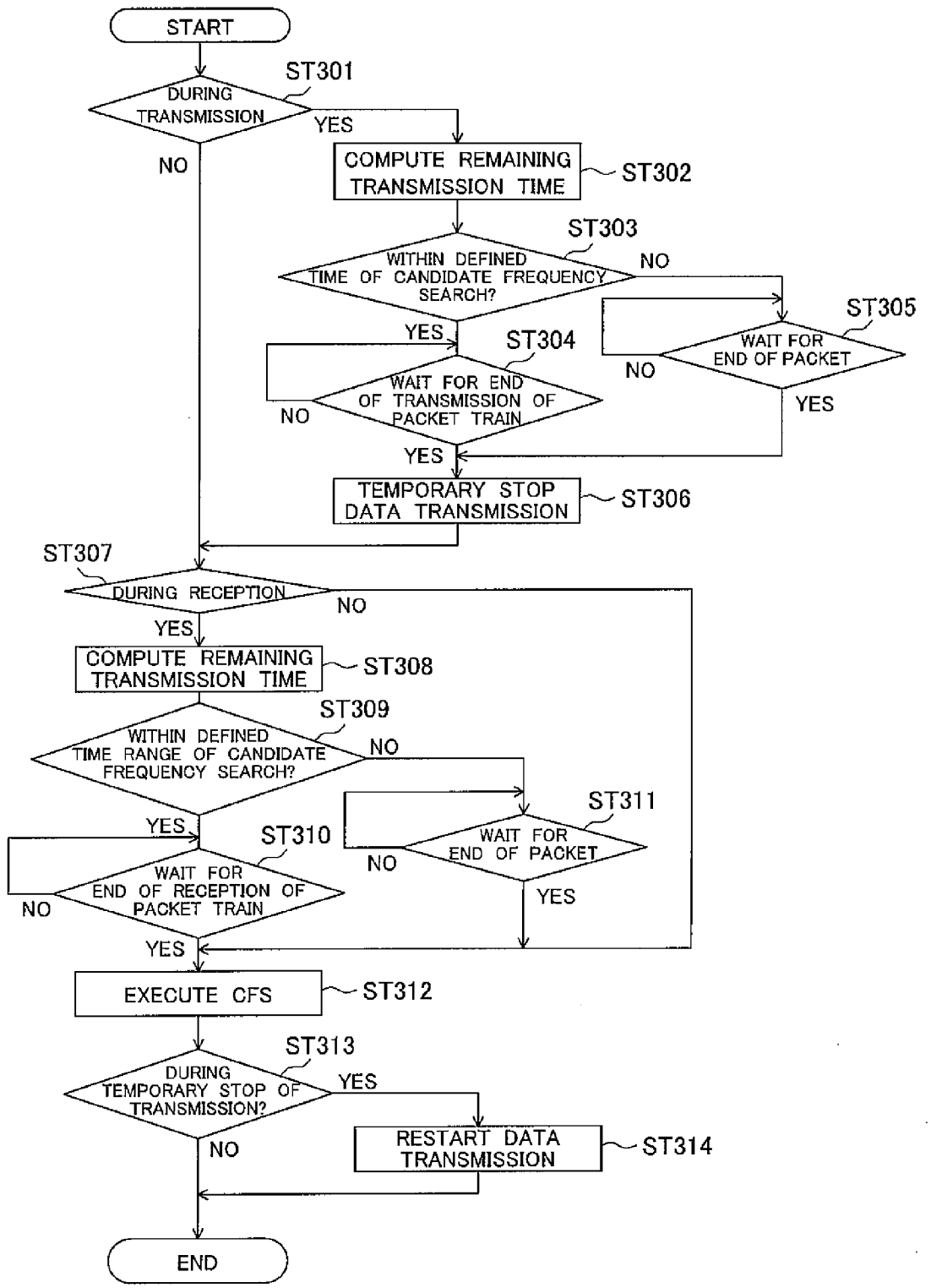
FIG. 6 is a flow chart for explaining the operation of a wireless communication terminal according to an embodiment of the present invention

FIG. 6 is a flow chart cited for explaining the operation of a wireless communication terminal according to an embodiment of the present invention. Further, FIG. 7A to FIG. 7C and FIG. 8A to FIG. 8D are diagrams showing relationships between the packets and the scheduling of search processing cited for explaining the operation of the wireless communication terminal according to the embodiment of the present invention. FIG. 7A to FIG. 7C show a case where the transmission ends in a defined time, and FIG. 8A to FIG. 8D show a case where it does not end in the defined time.

Below, the operation of the wireless communication terminal according to the embodiment of the present invention shown in FIG. 4 will be explained in detail with reference to FIG. 6, FIG. 7A to FIG. 7C, and FIG. 8A to FIG. 8D.

Here, an example of inter-packet search processing changing the processing up to when the acquisition processing operation (CFS) is carried out in accordance with the condition when a search request (CFSRQM) was received will be explained with reference to FIG. 6.

Here, a search operation will be explained by illustrating a case of a periodic search request of the search type=3.

In the case of the single search request of the search type=1, the report must be returned back to the base station 20 only one time. The search of hand-off candidate frequencies required for that purpose is kept to about 1 to 2 times. For this reason, loss in the case of the single search request is the same as a data loss due to deterioration of wireless quality at the time of the communication and does not become a serious problem, therefore is treated as out of the scope of control of the search operation explained below. Further, a search operation which will be explained below is carried out only during the data communication. A conventional search operation is carried out during call voice communication.

The flow chart of FIG. 6 assumes that the wireless communication terminal 10 receives a CFSRQM of the search type=3 showing that the search of hand-off candidate frequencies must be periodically executed from the base station 20 during data communication (during transmission of a packet sequence). At this time, the wireless communication terminal 10 executes a search of hand-off candidate frequencies and performs scheduling of searches in the following sequence at that time.

First of all, at the timing when trying to execute a search of hand-off candidate frequencies, the wireless communication terminal 10 judges whether or not the data is being transmitted at present (not "NULL", but user data stored in the memory part 13 is transmitted) (ST301).

In the case of during data transmission (ST301 "Yes"), the terminal monitors the remaining amount of data being transmitted and judges whether or not the defined time is not violated even when the search is executed after waiting for the end of transmission of that remaining amount of data.

Here, the hand-off processing part 120 confirms the size of the data to be transmitted with reference to the memory part 13, specifies the remaining amount of the transmission data according to the difference between this and an amount of data which has been already finished being transmitted as the transmission packet, and computes the remaining transmission time of the following packets being transmitted at present (ST302). Further, the hand-off processing part 120 judges whether or not the transmission time obtained as the result of this computation is within a defined time range of the search for hand-off candidate frequencies (ST303).

Specifically, the remaining transmission time can be computed by the transmission/reception completion time prediction operation part 128 acquiring data concerning the remaining transmission data amount from the transmission/reception data amount acquisition part 126 and subtracting this acquired data and the predicted transmission/reception rate computed by the transmission/reception rate prediction operation part 127.

Then, by having the comparison operation part 130 compare the computed time with the defined time monitored by the timer 129, the time can be judged whether or not the remaining transmission time of the following packets being transmitted at present is within the defined time range of the search of hand-off candidate frequencies.

Note that, the comparison computation part 130 covers a search request at a constant period of the search type=3 here, therefore ends up judging whether or not this time search can be ended even if the packet being transmitted at present is ended in transmission in a duration up to the next arriving search period.

The wireless communication terminal 10 must report the search result based on the search cycle designated together with the search type 3 when receiving the search request (CFSRQM). For this reason, when a search result report at an interval of x seconds is requested when receiving the search request, and y seconds are required for the search and the report of that, a time not more than "x−y" seconds obtained by subtracting y seconds from x seconds from the reception of the search request becomes the search defined time. Namely, when the time required for the search and the report of that may be very short, it can be understood that at least a time interval designated by the search cycle is the search defined time as well.

Here, when the time is judged that the time is within the defined time range (ST303 "Yes"), the hand-off processing part 120 controls the search control part 123 so as to wait for the end of transmission of the continuous packet train and execute the search processing after completing the transmission of all packets (ST304).

On the other hand, when the search processing is executed after the end of the transmission of all packets and search time is judged that the search time is not within the defined time (ST303 "No"), the hand-off processing part 120 controls the search control part 123 so as to wait for the end of the transmission of the data transfer unit, that is, packet, and perform the search processing between the packet being transmitted and the next transmission packet following the former (ST305). Further, the hand-off processing part performs control stopping the temporary transmission of a packet immediately after this packet and on at the border of this packet.

Next, the wireless communication terminal 10 judges whether or not the packet is being received at present (not "NULL", but the user data from the base station communicated with at present is being received) (ST307). In the case of during reception (ST307 "Yes"), if the remaining amount of the data being received is seen, the wireless communication terminal judges whether or not the defined time is not violated even if the search is executed after waiting for the end of the reception of that remaining amount based on that.

Here, the hand-off processing part 120 computes the remaining reception time of the following packets being transmitted at present (ST308) and judges whether or not the reception time obtained as the result of the computation is within the defined time range of the search for hand-off candidate frequencies (ST309).

Specifically, the hand-off processing part 120 computes the remaining reception time by finding the information which becomes the header portion of the data received from the packet finished being received and extracting a total amount of the data received. Alternatively, the hand-off processing part 120 can predict the reception completion time by acquiring the information of the data to be received from the server in advance and storing the information in the memory part 13 at a stage where the start of reception is instructed at the operation part 18, acquiring the total amount of data being received at present with reference to this or the like, and computing the remaining reception time from the reception rate predicted from the present reception situation.

Then, the comparison operation part 130 compares this with the defined time based on the previously explained search cycle monitored by the timer 129, whereby the hand-off processing part 120 can judge whether or not the remaining reception time of following packets being received at present is within the defined time range of the search for hand-off candidate frequencies.

Here, when the remaining reception time is judged that the time is within the defined time range (ST309 "Yes"), the hand-off processing part 120 controls the search control part 123 so as to wait for the reception of the continuous packet train and execute the search processing after completing the reception of all packets (ST310).

On the other hand, when the remaining reception time is judged that the time is not within the defined time in the case where the search processing is executed after the reception of all packets ends (ST309 "No"), the hand-off processing part controls the search control part 123 so as to wait for the end of packet and perform the search processing between the packet being received at present and the next reception packet following the former (ST311).

Note that, when the remaining amount of the data being received is not known, the hand-off processing part controls the search control part 123 so as to perform the search processing between reception packets.

Next, at step ST312, the search of the hand-off candidate frequencies described above is carried out, and the search result is reported (CFSRPM) at a point of time when the original frequency is restored (ST312). Further, when the reception is restarted and there is a transmission packet being temporarily stopped (ST313 "Yes"), the hand-off processing part 120 controls the communication part 11 to restart the transmission/reception (ST314).

The actual processing of the wireless communication terminal 10 according to the embodiment of the present invention described above is shown in FIG. 7A to FIG. 7C and FIG. 8A to FIG. 8D as <Example 1> and <Example 2>.

Example 1

FIG. 7A to FIG. 7C show the relationships between the packets being transmitted/received and the scheduling of search processing in a case where the remaining amount of the transmission data at the stage where a search request designating the search type 3 is received ends in the search defined time, but the reception is not completed in the search defined time as explained with reference to FIG. 6.

First, as shown in FIG. 7A, when it is judged that the transmission is completed in the defined time at the stage where the search request is received, the completion of data transmission of the transmission data is waited for.

At a stage where the data transmission is completed, a packet of the reception data is still being received, therefore that reception is not completed in the defined time as shown in FIG. 7B. For this reason, the acquisition processing is further waited until the completion of the reception of the packet being received at the stage where the transmission is completed. As shown in FIG. 7C, the reception is once stopped at the stage where the reception of the packet being received is completed to execute the acquisition processing, and the reception of the reception data which had stopped is restarted at the stage where the acquisition processing is completed.

Example 2

On the other hand, FIG. 8A to FIG. 8D show relationships between the packets and the scheduling of search processing in a case where the transmission does not end in the search defined time (FIG. 8A) and further the reception does not end in the search defined time either (FIG. 8B).

When it is judged that the transmission is not completed in the defined time at the stage where the search request is received, as shown in FIG. 8C, an extra margin is given to the search defined time, then the completion of transmission of the packets being transmitted is waited for. At the stage where the packet transmission is completed, the packets of the reception data are still being received, so the acquisition processing is further waited until the completion of this reception. As shown in FIG. 8D, the reception is once stopped and acquisition processing is executed at the stage where the reception of the packets being received is completed, and the reception of the reception data which had stopped is restarted in the stage where the acquisition processing is completed.

Note that, in both FIG. 7C and FIG. 8D, blocks indicated by CFS served with hatching show the search processing execution timings.

At this time, when waiting for the completion of transmission of the transmission or reception packets so that the acquisition processing can be completed in the search defined time, by providing at least an extra margin to the time required for the acquisition processing, even if the completion of transmission of the packets is waited for, the acquisition processing up to the report of the search result to the base station can be completed. Further, in a case where both transmission and reception are to be completed in the search defined time, preferably the acquisition processing is kept waiting until both transmission and reception are completed. However, even in this case, it is necessary to provide an extra margin to at least the amount of the time required for the acquisition processing.

Note that, when the transmission has not been carried out at the timing when the search of the hand-off candidate frequencies is to be executed, the schedule of the search can be determined by just the situation of the reception. Further, by executing the search processing by monitoring not only the packet environment hitherto, but also the timing when the transmission/reception rate is low within the defined time range where the search processing must be executed, the amount of a loss of data which could not be received due to switching of frequency can be suppressed to the lowest limit.

FIG. 9A and FIG. 9B show the relationships between the packets and the scheduling of search processing in a case where the transmission is not carried out as <Example 3>. Here, both of FIG. 9A and FIG. 9B show reception data as an example. Note that, the same processing in accordance with the rate may be carried out for the transmission data in the same way as well.

First, when receiving a search request, the hand-off processing part 120 monitors the reception (transmission) rate generated by the reception (transmission) rate prediction operation part 127 while providing an extra margin to the search defined time.

For example, the hand-off processing part 120 compares the data with the reception (transmission) rate at the time of the reception of the search request or the threshold value defined in advance, does not perform the acquisition processing until the stage where it becomes lower than these values, waits for the completion of the reception (transmission) of the packets being received (transmission) if such a drop in rate occurs, performs the acquisition processing when the reception (transmission) is completed, and then restarts the reception (transmission) of the following packets.

Note that, a check of the reception (transmission) rate may be carried out at steps ST303 and ST309 of FIG. 6.

Due to this, the search processing is executed at a timing when the reception (transmission) rate is as low as possible within the defined time range where the search must be carried out, therefore a drop of throughput by performing the acquisition processing can be prevented.

Note that, in FIG. 9B, a hatched block indicated by CFS shows the search processing execution timing. Incidentally, when the reception (transmission) rate does not become low within the time obtained by subtracting the time required for the acquisition processing from the defined time, the search processing is executed so that the acquisition processing is within the defined time irrespective of the reception (transmission) rate.

As explained above, according to the wireless communication terminal 10 according to the present embodiment, by executing a search of hand-off candidate frequencies at the border of a packet of data being transmitted or received by execution of the MAHHO operation in the data communication, it becomes possible to suppress breakage of data occurring at the time of switching in periodic candidate frequency searches carried out during the MAHHO operation to the lowest limit and retransmission is suppressed. Therefore, even during execution of the MAHHO operation, deterioration of the data transfer efficiency can be reduced and a drop of throughput can be suppressed.

Further, the terminal is configured to switch the frequency aiming at the timing when the transmission/reception rate is low, therefore the data which cannot be received during switching of the frequency is suppressed to the lowest limit and excessive data retransmission can be suppressed. Namely, a drop of throughput can be further suppressed.

Note that, the flow chart shown in FIG. 6 shows steps of a hand-off method in a wireless communication system of the present invention in addition to an explanation of the operation of the wireless communication terminal 10 according to the embodiment of the present invention or the base station 20.

Namely, a hand-off method according to the embodiment of the present invention is a hand-off method continuing wireless communication by switching a communication channel from a frequency being used at present to another frequency in a wireless communication terminal 10 performing wireless communication with a plurality of base stations 20, having a search request reception step (ST301, ST307) of receiving a search request requesting an acquisition processing of hand-off candidate frequencies, a transmission wait step (ST301 to ST305, ST307 to ST311) of waiting for the completion of the transmission of a packet being transmitted when the search request reception step occurs during the transmission processing of data comprised of a plurality of packets, and an acquisition processing step (ST306, ST312) in which, when the transmission is completed in the transmission wait step, the transmission of the following packets is stopped and the frequency being used at present is switched to the hand-off candidate frequency to perform the acquisition processing.

According to the hand-off method in the wireless communication system according to the embodiment of the present invention, the breakage of data due to the switching of frequency can be avoided as much as possible. Further, by suppressing the retransmission of data as much as possible, a drop of the data transfer efficiency (throughput) can be suppressed.

Further, by executing the search of hand-off candidate frequencies with discretion at a timing where the transmission/reception rate is low by execution of an MAHHO operation, the amount data loss can be suppressed to the lowest limit and a drop of the data transfer efficiency can be suppressed.

Further, even during transmission/reception of long and large data, the acquisition processing is carried out between packets, therefore there is the possibility that a hand-off instruction from the base station can be quickly received without causing retransmission processing etc. of a packet.

Accordingly, even if the data rate has been lowered, in a case where a hand-off is quickly carried out, it can be assumed that a channel with a better environment is shifted to. It is clear that the data rate after the hand-off is improved, therefore the transmission of the data after the hand-off becomes fast, and the transmission/reception time can be shortened as a result when transmitting long and large data.

Note that, the present invention is not limited to the above embodiment. Namely, at the time of carrying out the present invention, various modifications, combinations, sub-combinations, and alternations may occur depending on components of the above embodiment insofar as they are within the scope of the appended claims or the equivalents thereof.

Further, in the above embodiment, an explanation was given of a wireless communication system compatible with three types of frequency bands of the present 800 MHz, new 800 MHz, and 2 GHz bands, but the present invention is not limited to this. It may be a wireless communication system for a frequency other than the three types described above as well. The number of types of compatible frequency bands is not limited to three types either, but may be any number of types as well.

Further, the explanation of the present invention was given by using an embodiment based on MAHHO, but the present invention is not limited to this, and can be applied to an entire hard hand-off.

The invention claimed is:

1. A wireless communication terminal comprising:
a communication part selecting one frequency from among a plurality of frequencies capable of transmission/reception of packets and performing wireless communication with a plurality of base stations, wherein the communication part is a transmission/reception section; and
a control part switching a frequency used by the communication part and executing the wireless communication, wherein the control part is an inter-packet search processing section, wherein
the control part
executes inter-packet search processing controlling the communication part so as to wait for completion of the transmission of a packet being transmitted when the communication part receives a search request requesting processing for acquisition of hand-off candidate frequencies during transmission of data formed by a continuous plurality of packets,
temporarily stops the transmission of subsequent packets after completing the transmission of the packet being transmitted in a hard hand-off mode,
switches a frequency being used at present to a hand-off candidate frequency after completing the transmission of the packet being transmitted,
performs an acquisition processing, and
restarts the transmission of the subsequent packets that has been temporarily stopped after completing the acquisition processing.

2. A wireless communication terminal as set forth in claim 1, wherein the control part
executes inter-packet search processing controlling the communication part so as to wait for completion of the reception of a packet being received when the communication part receives a search request requesting processing for acquisition of hand-off candidate frequencies during the transmission of data formed by a continuous plurality of packets, if receiving packets without transmitting them, and
stops the transmission of the subsequent packets when completing the reception of the packet being received.

3. A wireless communication terminal as set forth in claim 1, wherein the control part
executes inter-packet search processing controlling the communication part so as to wait for completion of transmission of a packet either being transmitted or received when the communication part receives a search request requesting processing for acquisition of hand-off candidate frequencies during the transmission of data formed by a continuous plurality of packets, if transmitting and receiving packets,
stops the transmission of the subsequent packets on the frequency currently in use by the communication terminal and waits for the completion of the transmission of the subsequent packets on another frequency if transmission of packets in the other is continued even when the transmission of the packets in the other is completed, and
stops the transmission of the subsequent packets in the other when the transmission of the packets is completed in the other.

4. A wireless communication terminal as set forth in claim 1, wherein the control part
can monitor the transmission rate in the communication part, and
performs the inter-packet search processing if the transmission rate after the reception of the search request becomes lower than the transmission rate at the time of the reception of the search request when receiving the search request.

5. A wireless communication terminal as set forth in claim 1, wherein the control part
specifies a search defined time based on the received search request when receiving the search request,
judges the possibility of whether the transmission of a packet being transmitted is completed in the search defined time, and
performs the inter-packet search processing when the transmission is not completed in the search defined time.

6. A hand-off method continuing wireless communication by switching a communication channel from a frequency being used at present to another frequency in a wireless communication terminal performing wireless communication with a plurality of base stations, said method including:
a search request reception step of receiving a search request requesting processing for acquisition of hand-off candidate frequencies;
a transmission wait step of waiting for the completion of the transmission of a packet being transmitted when a search request is received in the search request reception step during the transmission of the data formed by a plurality of packets;
an acquisition processing step of temporarily stopping the transmission of subsequent packets after the transmission of the packet being transmitted, in a hard hand-off mode, is completed in the transmission wait step, switching the frequency being used at present to the hand-off candidate frequency after completing the transmission of the packet being transmitted, and performing an acquisition processing; and
restarting the transmission of the subsequent packets that has been temporarily stopped after completing the acquisition processing.

7. A wireless communication system comprising:
a plurality of base stations; and
a wireless communication terminal performing wireless communication with the plurality of base stations, wherein the wireless communication terminal comprises:

a communication part selecting one frequency from among a plurality of frequencies capable of transmission/reception of packets and performing wireless communication; and a control part switching a frequency used by the communication part and executing the wireless communication, and the control part executes inter-packet search processing controlling the communication part so as to wait for completion of the transmission of a packet being transmitted when the communication part receives a search request requesting processing for acquisition of hand-off candidate frequencies during transmission of data formed by a continuous plurality of packets, temporarily stops the transmission of subsequent packets after completing the transmission of the packet being transmitted, in a hard hand-off mode, switches the frequency being used at present to a hand-off candidate frequency after completing the transmission of the packet being transmitted, performs an acquisition processing, and restarts the transmission of the subsequent packets that has been temporarily stopped after completing the acquisition processing.

* * * * *